United States Patent
Zoghlami et al.

(10) Patent No.: US 7,499,570 B2
(45) Date of Patent: Mar. 3, 2009

(54) ILLUMINATION INVARIANT CHANGE DETECTION

(75) Inventors: Imad Zoghlami, Plainsboro, NJ (US); Dorin Comaniciu, Princeton Jct., NJ (US); Visvanathan Ramesh, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 769 days.

(21) Appl. No.: 11/066,772

(22) Filed: Feb. 25, 2005

(65) Prior Publication Data

US 2005/0196045 A1 Sep. 8, 2005

Related U.S. Application Data

(60) Provisional application No. 60/549,457, filed on Mar. 2, 2004.

(51) Int. Cl.
*G06K 9/00* (2006.01)
*G06K 9/36* (2006.01)
*G06K 9/46* (2006.01)

(52) U.S. Cl. ........................ 382/103; 382/232; 382/236; 382/250

(58) Field of Classification Search .................. 382/103, 382/232, 236, 250
See application file for complete search history.

(56) References Cited

U.S. PATENT DOCUMENTS

| 5,126,962 | A   | * | 6/1992 | Chiang ........................ 708/401 |
| 6,396,955 | B1  | * | 5/2002 | Abe ............................. 382/232 |
| 7,046,865 | B2  | * | 5/2006 | Kasutani ...................... 382/305 |
| 7,088,863 | B2  | * | 8/2006 | Averbuch et al. ............. 382/209 |
| 2007/0025623 | A1 | * | 2/2007 | Iizuka et al. ................. 382/232 |

\* cited by examiner

*Primary Examiner*—John B Strege
(74) *Attorney, Agent, or Firm*—Donald B. Paschburg; F. Chau & Associates, LLC

(57) ABSTRACT

A system and method for illumination invariant change detection are provided, the system including a processor, an energy ranking unit in signal communication with the processor for extracting block coefficients for the first and second images and computing an energy difference responsive to the coefficients for a frequency energy between the first and second images, and a change detection unit in signal communication with the processor for analyzing the energy difference and detecting a scene change if the energy difference is indicative of change; and the method including receiving first and second images, extracting block coefficients corresponding to frequency energies for the first and second images, computing an energy difference for at least one of the frequency energies between the first and second images, analyzing the at least one energy difference, and detecting a scene change if the energy difference is indicative of change.

20 Claims, 8 Drawing Sheets

ILLUMINATION INVARIANT CHANGE DETECTION

CROSS-REFERENCE TO RELATED APPLICATION

This application claims the benefit of U.S. Provisional Application Ser. No. 60/549,457, filed Mar. 2, 2004 and entitled "Illumination Invariant Change Detection in the Feature Space, Illustration in DCT domain", which is incorporated herein by reference in its entirety.

BACKGROUND

In image processing and surveillance applications, for example, change detection is often desired for automatically detecting object changes in a scene. Unfortunately, changes in illumination may be misinterpreted as object changes by the automated systems, thus requiring human intervention and additional time. Accordingly, what is desired is illumination invariant change detection.

SUMMARY

These and other drawbacks and disadvantages of the prior art are addressed by an exemplary system and method for illumination invariant change detection.

An exemplary system for illumination invariant change detection includes a processor, an energy ranking unit in signal communication with the processor for extracting block coefficients for the first and second images and computing an energy difference responsive to the coefficients for a frequency energy between the first and second images, and a change detection unit in signal communication with the processor for analyzing the energy difference and detecting a scene change if the energy difference is indicative of change.

An exemplary method for illumination invariant change detection includes receiving first and second images, extracting block coefficients corresponding to frequency energies for the first and second images, computing an energy difference for at least one of the frequency energies between the first and second images, analyzing the at least one energy difference, and detecting a scene change if the energy difference is indicative of change.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for illumination invariant change detection in accordance with the following exemplary figures, in which.

DETAILED DESCRIPTION OF PREFERRED EMBODIMENTS

Embodiments of the present disclosure determine whether an apparent change in imagery is merely due to illumination or due to an actual change within the scene. Exemplary method embodiments for illumination invariant change detection work directly in the discrete cosine transform (DCT) or other compressed domain to save the cost of decompression. The illumination change may be treated as a local contrast change, treated with a nonparametric ranking of the DCT coefficients, and/or treated by ranking only DCT coefficient extremes.

Figure 1:
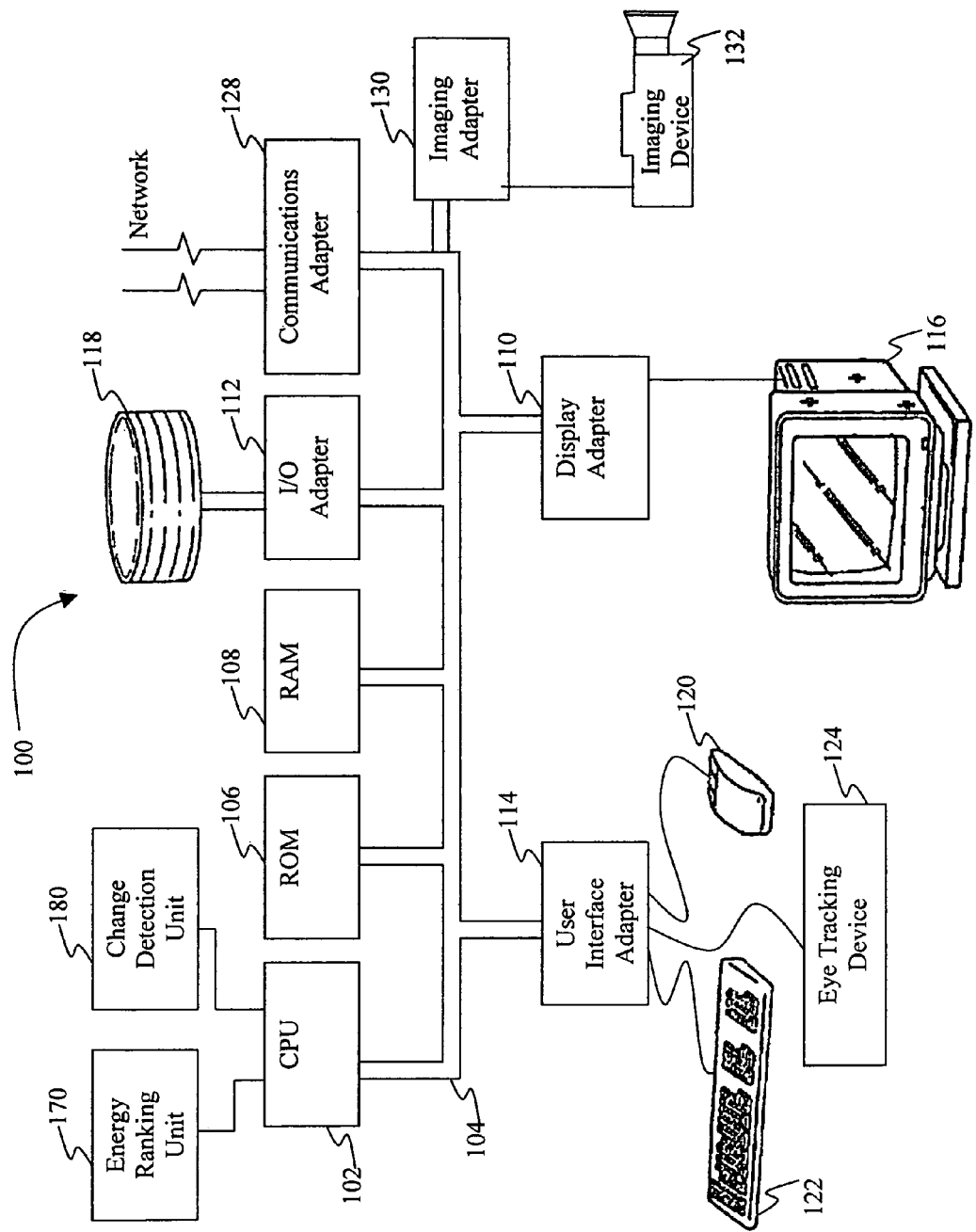
FIG. 1 shows a schematic diagram of a system for illumination invariant change detection in accordance with an illustrative embodiment of the present disclosure.

As shown in FIG. 1, a system for illumination invariant change detection, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

An energy ranking unit 170 and a change detection unit 180 are also included in the system 100 and in signal communication with the CPU 102 and the system bus 104. While the energy ranking unit 170 and the change detection unit 180 are illustrated as coupled to the at least one processor or CPU 102, these components are preferably embodied in computer program code stored in at least one of the memories 106, 108 and 118, wherein the computer program code is executed by the CPU 102.

Figure 2:
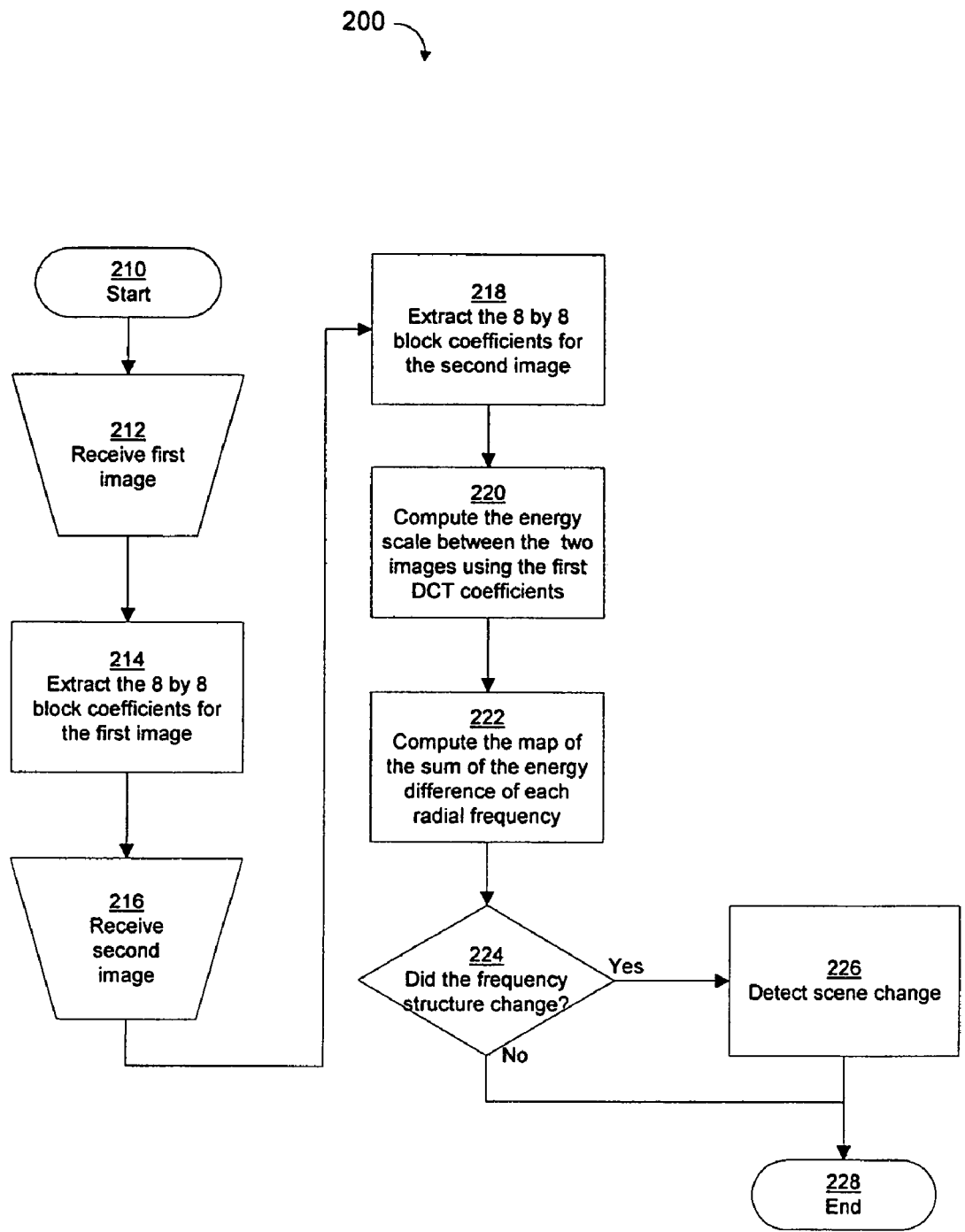
FIG. 2 shows a flow diagram of a method for illumination invariant change detection in accordance with an illustrative embodiment of the present disclosure.

Turning to FIG. 2, a method for illumination invariant change detection, according to an illustrative embodiment of the present disclosure, is indicated generally by the reference numeral 200. The method 200 includes a start block 210 that passes control to an input block 212. The input block 212 receives a first image and passes control to a function block 214. The function block 214 extracts the 8 by 8 block coefficients for the first image and passes control to an input block 216. The input block 216 receives a second image and passes control to a function block 218. The function block 218 extracts the 8 by 8 block coefficients for the second image and passes control to a function block 220.

The function block 220 computes the energy scale between the two images using the first DCT coefficients, and passes control to a function block 222. The function block 222, in turn, computes the map of the sum of the energy difference of each radial frequency, and passes control to a decision block 224. The decision block 224 determines whether the frequency structure has changed, and if so, passes control to a function block 226. If not, the decision block 224 passes control to an end block 228. The function block 226 detects a scene change and passes control to the end block 228.

Figure 3:
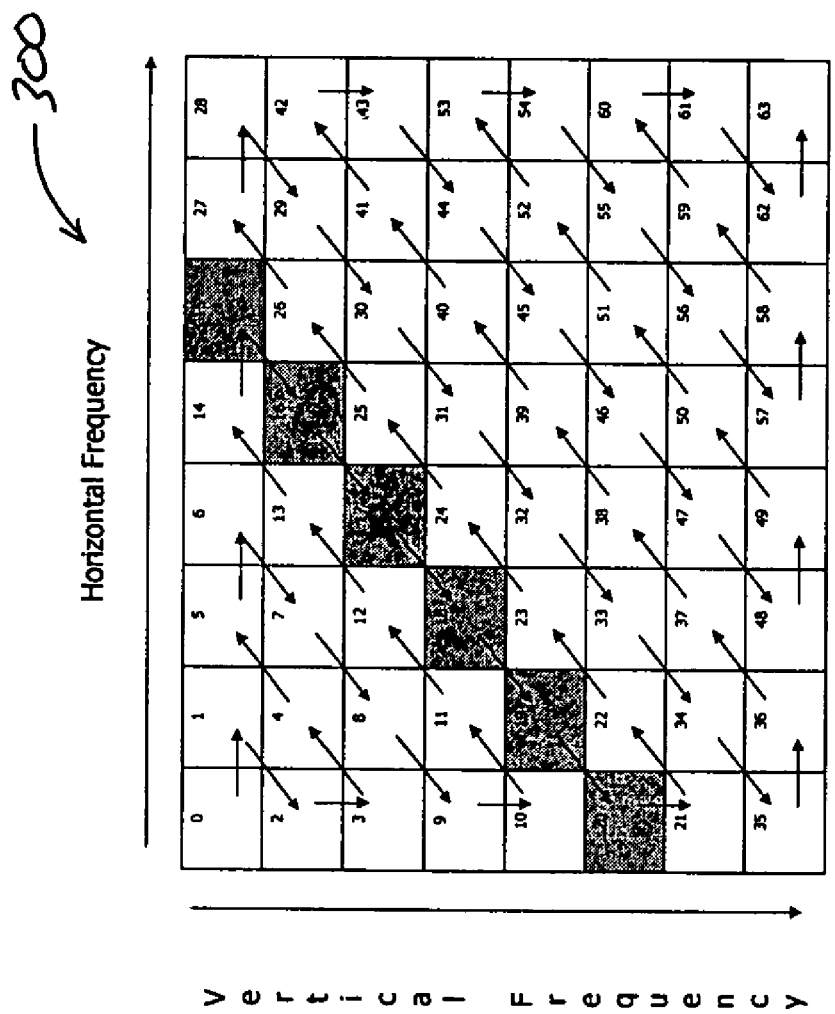
FIG. 3 shows a schematic diagram of a coefficient transformation matrix in accordance with an illustrative embodiment of the present disclosure.

Turning now to FIG. 3, an 8 by 8 block coefficient transformation matrix is indicated generally by the reference numeral 300. The matrix 300 has an origin at the upper left, with vertical frequency increasing towards the lower portion and horizontal frequency increasing towards the right portion. The matrix 300 includes block coefficients 0 through 63, where the coefficients 15 through 20 form are arranged in a zigzag pattern as used in the Joint Photographic Experts Group (JPEG) standard, for example, which improves Run Length Coded (RLC) compression.

Figure 4:
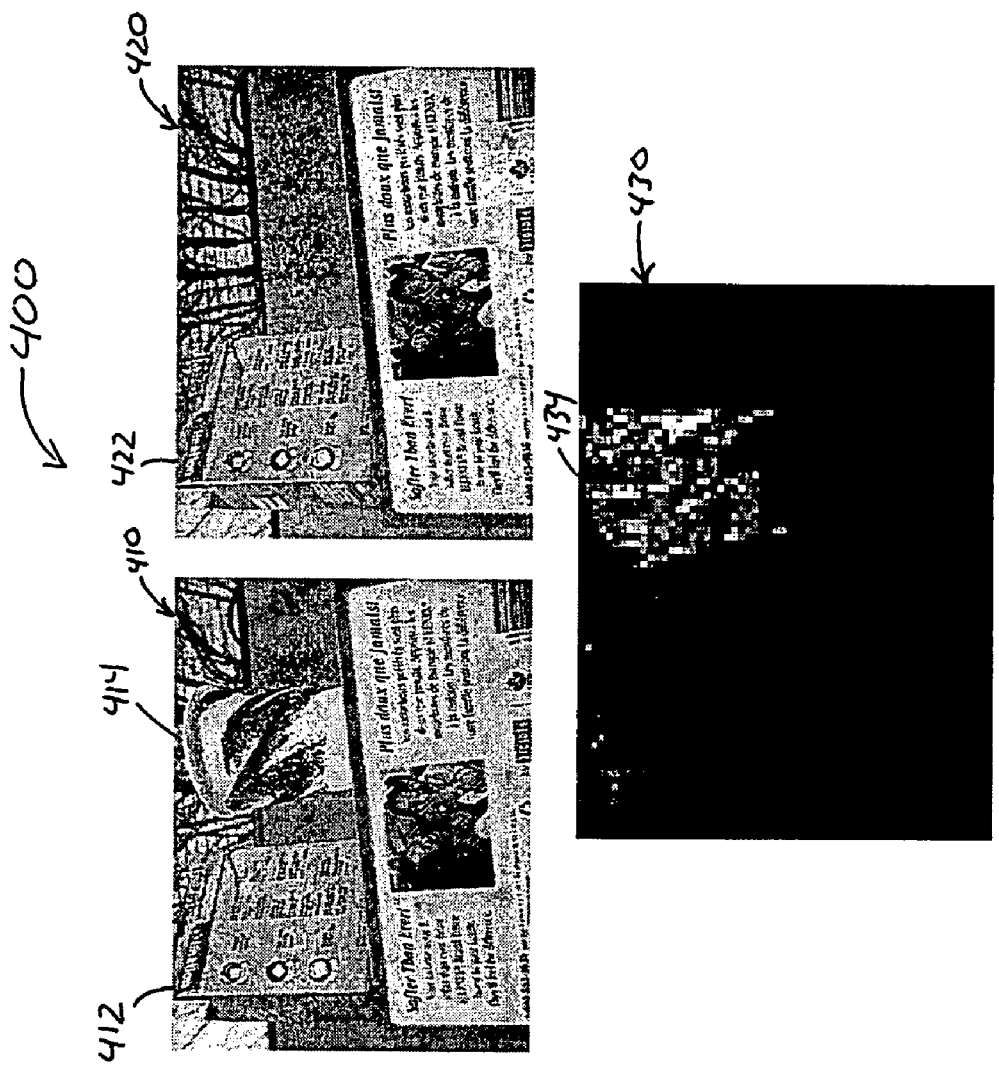
FIG. 4 shows graphical diagrams of image data with illumination and actual scene changes in accordance with an illustrative embodiment of the present disclosure.

As shown in FIG. 4, image data is indicated generally by the reference numeral 400. In a first image 410, a light is switched off. The first image 410 includes a floppy box 412 and a cup 414. In a second image 420, the light is switched on. The second image 420 includes a floppy box 422 showing only a difference in illumination compared to the floppy box 412. There is no cup present in the second image 420 in order to show removal of that object from the scene. The image 430 shows the computed energy differences between the images 410 and 420, including higher energy rankings 434 for the cup. Thus, embodiments of the present disclosure can detect the scene change comprising the missing cup while recognizing that the floppy box 422 is the same floppy box 412 with a change in illumination.

Figure 5:
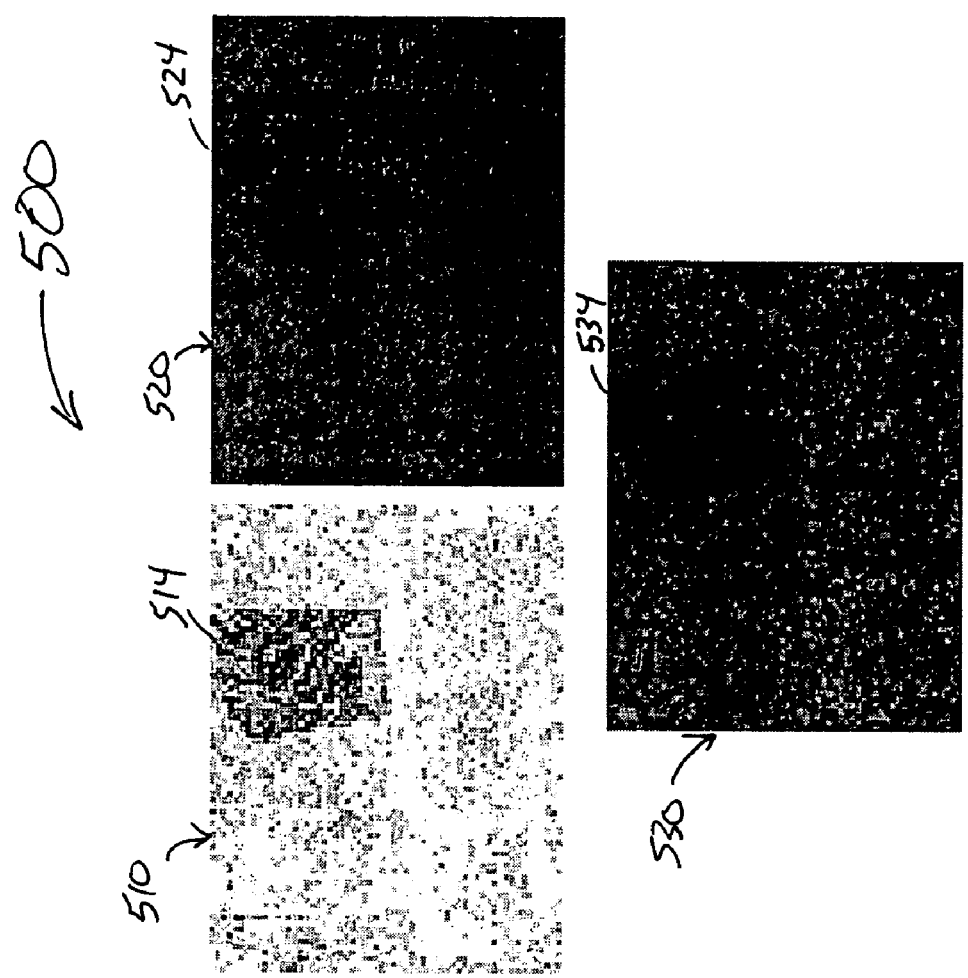
FIG. 5 shows graphical diagrams of exemplary rankings for DC coefficients in accordance with an illustrative embodiment of the present disclosure.

Turning to FIG. 5, exemplary rankings of the DC coefficients are indicated generally by the reference numeral 500. Here, a ranking 510 results from a sum-squared difference of ranks with higher rankings 514 for the cup, a ranking 520 results from a Spearman rank-order correlation with higher rankings 524 for the cup, and a ranking 530 results from Kendall's Tau ranking with higher rankings 534 for the cup.

Figure 6:
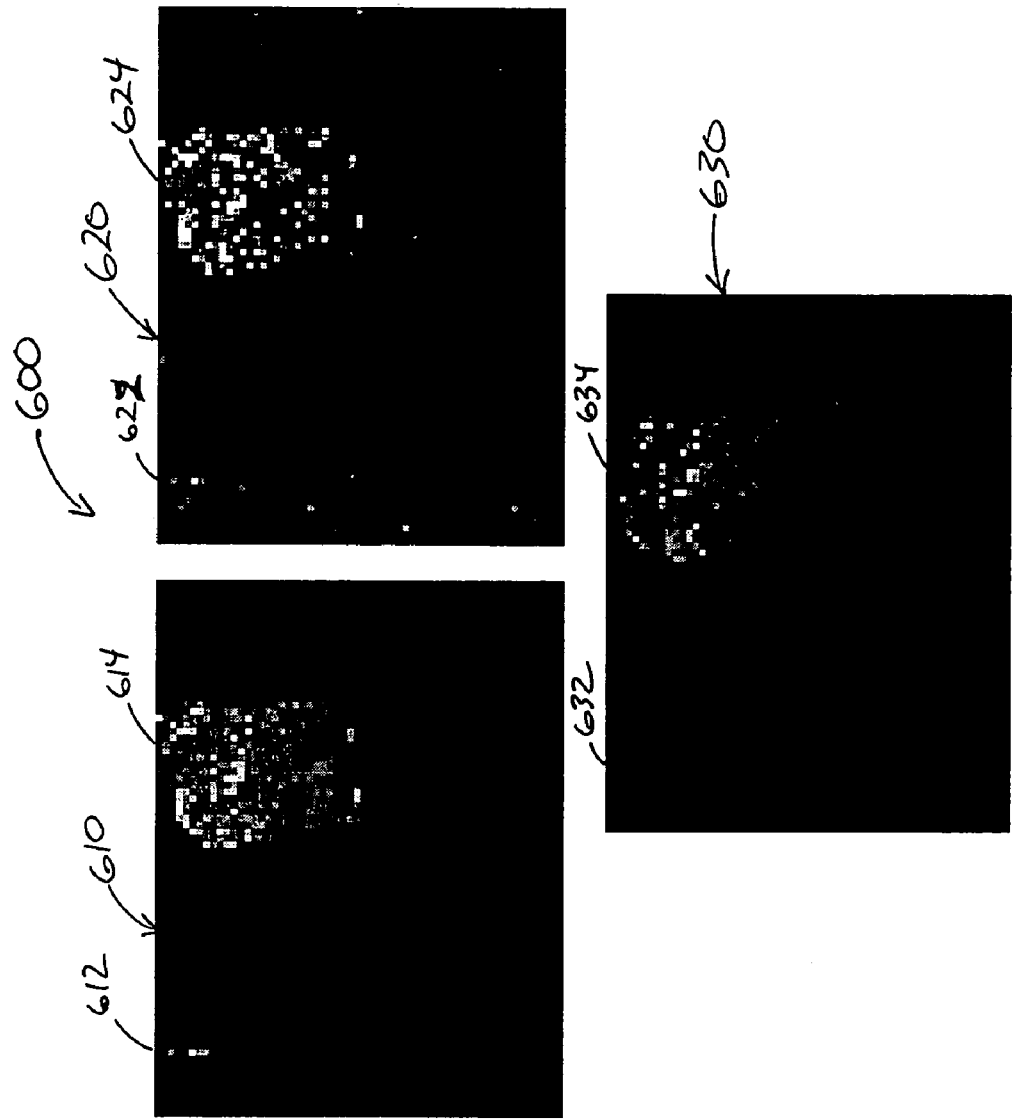
FIG. 6 shows graphical diagrams of results for different energy rankings in accordance with an illustrative embodiment of the present disclosure.

Turning now to FIG. 6, results of different energy rankings are indicated generally by the reference numeral 600. A first ranking 610 results when an energy comparison is done for all of the energies, and includes results 612 for the box and 614 for the cup. A second ranking 620 results when an energy comparison is done between energies with the same radial frequency and includes results 622 for the box and 624 for the cup. Here, note that ranking of all the energies, as in the ranking 610, is less noisy than ranking inside each radial frequency, as in the ranking 620.

A third ranking 630 results when an energy comparison is done between radial frequency energies and includes results 612 for the box and 614 for the cup. Note that due to the quantification, only the first frequencies are not null. This provides a very fast algorithm because the energy comparison is done for much less than the pixel number. For example, in most of the test cases only the first four radial energies are not null, which leads to less than 10 energy comparisons.

Figure 7:
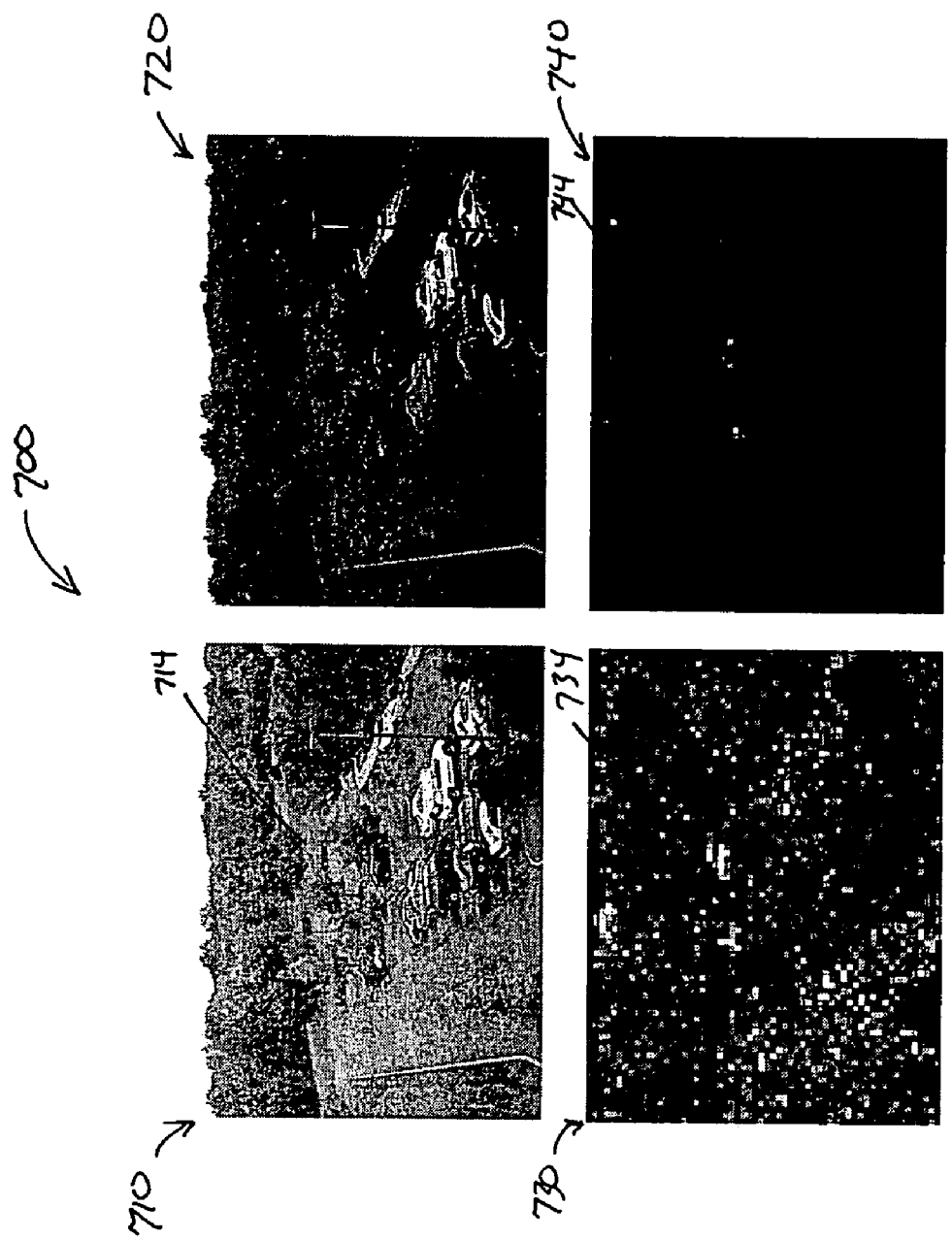
FIG. 7 shows graphical diagrams of night image data with illumination and actual scene changes in accordance with an illustrative embodiment of the present disclosure.

As shown in FIG. 7 night images are indicated generally by the reference numeral 700. In a first image 710, a car 714 is present at dusk. In a second image 720, the car is missing after dark. The car 714 of the first image is missing in the second image 420 in order to show removal of that object from the scene. The image 730 shows the computed map of energy differences between the images 710 and 720 using Kendall's Tau operator, including higher energy rankings 734 for the missing car. Due to the high level of gain, the camera noise is very high. Therefore, ranking all the energies is too noisy. The image 740 shows the computed map of energy differences between the images 710 and 720 using extremes ranking, including higher energy rankings 744 for the missing car. Thus, embodiments of the present disclosure can detect the scene change comprising the missing car while recognizing that other apparent changes are merely due to a change in illumination.

Figure 8:
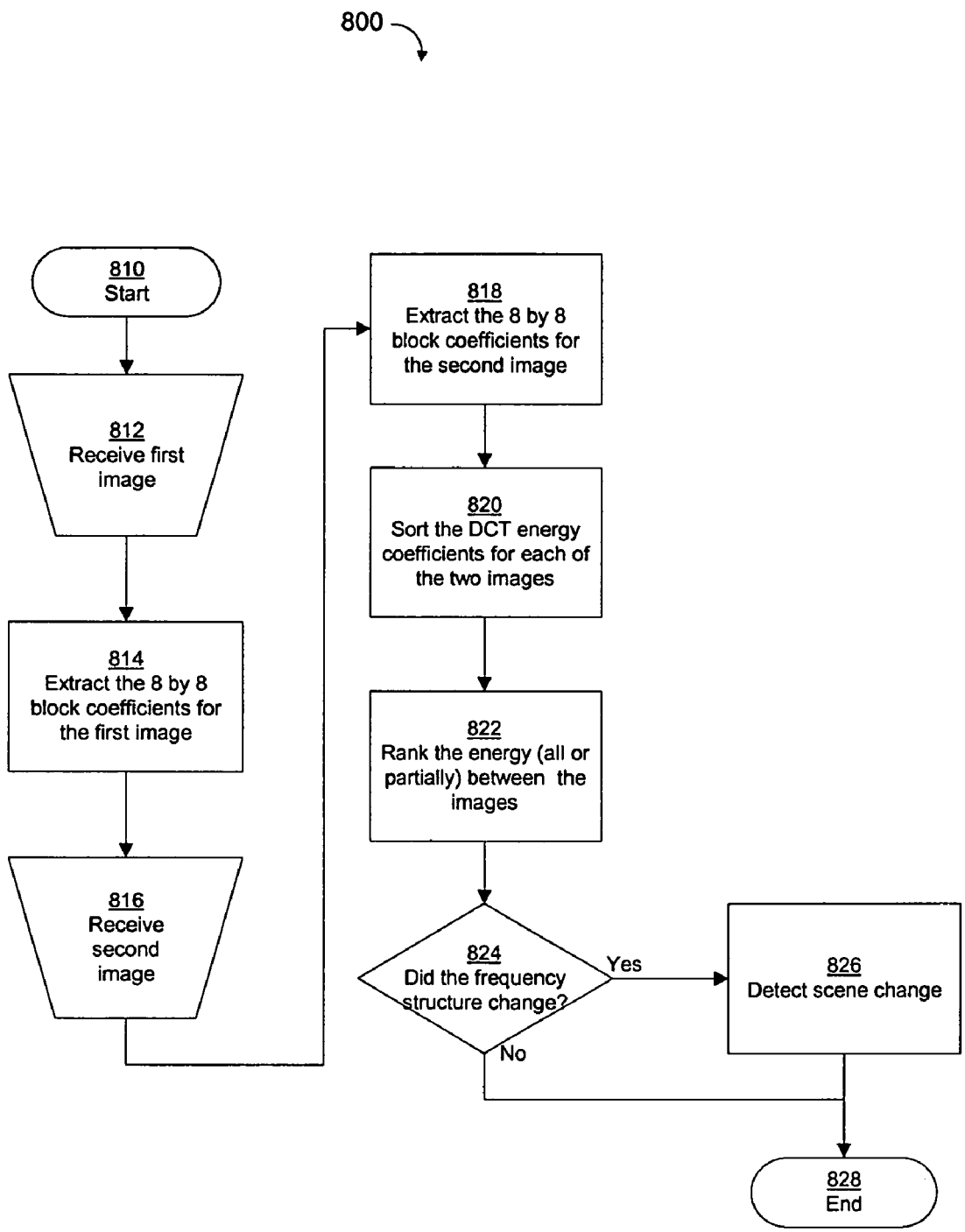
FIG. 8 shows a flow diagram of a method for illumination invariant change detection in accordance with an illustrative embodiment of the present disclosure.

Turning to FIG. 8, another method embodiment for illumination invariant change detection, according to an illustrative embodiment of the present disclosure, is indicated generally by the reference numeral 800. The method 800 includes a start block 810 that passes control to an input block 812. The input block 812 receives a first image and passes control to a function block 814. The function block 814 extracts the 8 by 8 block coefficients for the first image and passes control to an input block 816. The input block 816 receives a second image and passes control to a function block 818. The function block 818 extracts the 8 by 8 block coefficients for the second image and passes control to a function block 820.

The function block 820 sorts the DCT energy coefficients for each of the two images, and passes control to a function block 822. The function block 822 ranks the energy, all or partially, between the images. For example, the ranking may be for all energies or just for extremes in alternate embodiments. The function block 822, in turn, passes control to a decision block 824. The decision block 824 determines whether the frequency structure has changed, and if so, passes control to a function block 826. If not, the decision block 824 passes control to an end block 828. The function block 826 detects a scene change and passes control to the end block 828.

In operation, an exemplary method embodiment works in the Discrete Cosine Transformation (DCT) domain, where the DCT formula is given by Equation 1.

$$F(u, v) = \frac{2}{N} C(u)C(v) \sum_{x=0}^{N-1}\sum_{y=0}^{N-1} f(x, y)\cos\left(\frac{(2x+1)u\pi}{2N}\right)\cos\left(\frac{(2y+1)v\pi}{2N}\right) \quad \text{(Equation 1)}$$

where:

$u, v, x, y = 0, 1, \ldots N - 1$ $x, y$ are spatial coordinates in the sample domain $u, v$ are frequency coordinates in the transform domain $C(u), C(v) = \frac{1}{\sqrt{2}}$ for $u, v = 0$ $C(u), C(v) = 1$ otherwise In the case of JPEG compression, the variable N of Equation 1 is equal to 8, which yields an 8 by 8 block transformation as introduced above in the matrix 300 of FIG. 3. In the JPEG standard, the coefficients are arranged in this zigzag pattern. This type of coefficient reorganization improves the RLC compression.

One embodiment treats illumination as a local contrast change. For a given diagonal, such as the coefficients 15-20 of FIG. 3, a constant radial frequency with different orientation is obtained. This property is used to detect whether a change between two images is due to an illumination change or due to a scene change. In the case of an illumination change, the frequency structure does not change. Most of the time, the illumination change is only reflected in the DC coefficient of the transformation and in a resealing of the AC energies. Thus, the radial frequency energy may be used for more robustness.

Referring back to FIG. 2, the exemplary algorithm includes extraction of the 8 by 8 block coefficients for both image 1 and image 2, computation of the energy scale between the two images using the first DCT coefficient as set forth by Equation 2, and computation of the map of the sum of the energy difference of each radial frequency as set forth by Equation 3.

$$E_{Scale} = \frac{F_1(0,0)}{F_2(0,0)} \qquad \text{(Equation 2)}$$

$$E_{Diff} = \sum_{n=1}^{14} \left( \sqrt{\sum_{u+v=n} F_1(u,v)^2} - E_{Scale} * \sqrt{\sum_{u+v=n} F_2(u,v)^2} \right) \qquad \text{(Equation 3)}$$

Referring back to FIG. 4 showing an exemplary application, the first image 410 has no added lighting while the second image 420 has a light switched on. Here, the floppy box 422 shows a difference in illumination compared to the floppy box 412. An object, namely the cup 414, constitutes an actual scene difference since it is absent from the second image 420 to show how the algorithm detects a scene change using the energy map 430.

In operation of another exemplary embodiment, illumination change detection is done with a ranking approach. Such an approach may use a nonparametric correlation. Nonparametric correlation of the energies is used to estimate the correlation between the two images. All nonparametric correlations are applicable. For simplicity of discussion, but without loosing generality, a method is described using a sum-squared difference of ranks, but alternate embodiments may use a Spearman rank-order correlation or Kendall's Tau ranking.

Referring back to FIG. 5 and the exemplary ranking of the DC coefficients 510, Ri(1) is the rank of ei1 or the ith energy of the first image, Ri(2) is the rank of ei2 or the ith energy of the second image, and one possible ranking of the 8 by 8 energy matrix can be the zigzag order used in JPEG compression. Then the sum-squared difference of ranks is given by Equation 4.

$$D = \sum_i (R_i^{(1)} - R_i^{(2)})^2 \qquad \text{(Equation 4)}$$

A Spearman Rank-Order Correlation Coefficient is given by Equation 5.

$$rs = \frac{\sum_i (R_i^{(1)} - \overline{R}_i^{(1)})(R_i^{(2)} - \overline{R}_i^{(2)})}{\sqrt{\sum_i (R_i^{(1)} - \overline{R}_i^{(1)})^2} \sqrt{\sum_i (R_i^{(2)} - \overline{R}_i^{(2)})^2}} \qquad \text{(Equation 5)}$$

Another exemplary embodiment uses extreme ranking. Referring back to FIG. 7, night images were described. Due to the high level of gain, the camera noise is very high. Thus, in this case, ranking all of the energies is too noisy.

For an application such as determination of whether an apparent change is an illumination change or a scene change, the algorithm can use the fact that it expects the same scene in many embodiments. In those cases, it may rank only the extremes. The two energies that work the most in opposition are used, that is, the two highest energies of opposite sign. These two opposite energies describe a large part of the image structure and are robust to the illumination changes and high frequency noise. The quantity measured is the difference between these two energies.

If the image pixels follow a Gaussian distribution, the DCT transformation coefficients also follow a Gaussian distribution as a sum of Gaussians. If e-hat is the observed energy value, the true value e can be approximated by N(e-hat, sigma-squared-sub-N-sub-e-hat), and the difference between the two selected energy at time t is given by Equation 6.

$$d^t = e_1^t - e_2^t \qquad \text{(Equation 6)}$$

Using the observed energy value, the approximation is given by Equation 7.

$$d^t \approx N\left(\hat{d}^t, \sigma_{N_{\hat{e}_1^t}}^2 + \sigma_{N_{\hat{e}_2^t}}^2\right) \qquad \text{(Equation 7)}$$

As preservation of the sign is desired between the consecutive times 1 and 2, Equation 8 is defined.

$$p_1 = P(d^1 \geq 0)$$

$$p_2 = P(d^2 \geq 0) \qquad \text{(Equation 8)}$$

Using the Bhattacharyya coefficient as the distance measurement, Equation 9 applies.

$$D = \sqrt{p_1 p_2} + \sqrt{(1-p_1)(1-p_2)} \qquad \text{(Equation 9)}$$

D measures the concurrence in ordering. Thus, if D is close to 1, the ordering is highly preserved; while if D is close to 0, the ordering is not consistent between the frames.

Referring back to FIG. 6, results using different energy rankings are indicated, where the first energy comparison 610 is done for all of the energies; the second ranking 620 is done between energies with the same radial frequency; and the third ranking 630 is done between radial energies. Due to the quantification, only the first frequencies are not null, which gives a very fast algorithm.

In an alternate embodiment, a DCT transformation may be used for non-compressed data. The present teachings may then be applied to the transformed data as discussed above.

In another alternate embodiment, a multi-scale approach provides great stability and a quick labialization. For non-compressed data, the method builds the image pyramid and process. For compressed data, the pyramid construction can be done in two ways, by uncompressing the data or by building the pyramid from the DCT coefficient. In the DCT coefficient case, the second level is built directly, and the DCT transformation is performed.

Building a three-dimensional (3D) DCT, where the three dimensions include 2D DCT space and time, and estimating its statistic is straightforward. The linearity of the DCT transformation leads to a simple way to compute the correlation between the coefficients. Thus, one can estimate its statistic starting from the image pixels statistic. This 3D DCT can be used for applications involving change detection on dynamic backgrounds, for example.

In alternate embodiments of the apparatus 100, some or all of the computer program code may be stored in registers located on the processor chip 102. In addition, various alternate configurations and implementations of the energy ranking unit 170 and the change detection unit 180 may be made, as well as of the other elements of the system 100. In addition, the methods of the present disclosure can be performed in color or in gray level.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for illumination invariant change detection comprising:
   using a computer to carry out the steps of: receiving first and second images;
   extracting block coefficients corresponding to radial frequency energies for the first and second images;
   scaling the radial frequency energies for one of the first or second images by a ratio of a first block coefficient of the other image to the first block coefficient of the one image;
   computing at least one energy difference for at least one of the radial frequency energies between the first and second images;
   analyzing the at least one energy difference; and
   detecting a scene change if the energy difference is indicative of change.

2. A method as defined in claim 1 wherein:
   computing at least one energy difference includes computing an energy scale responsive to the coefficients;
   analyzing the at least one energy difference includes mapping a sum of the energy difference responsive to the energy scale; and
   detecting a scene change is responsive to the frequency structure of the mapping.

3. A method as defined in claim 1 wherein the first and second images are processed in the feature space.

4. A method as defined in claim 3 wherein the feature space is one of the discrete cosine transform (DCT) domain and the wavelet domain.

5. A method as defined in claim 2 wherein the at least one energy difference is responsive to illumination change as a local contrast change.

6. A method as defined in claim 1 wherein the at least one energy difference is responsive to illumination change detection with a ranking approach.

7. A method as defined in claim 1 wherein the at least one energy difference is responsive to illumination change detection with a ranking approach and a sub-set ranking.

8. A method as defined in claim 1 wherein the at least one energy difference is responsive to detection with ranking only extremes DCT coefficients.

9. A method as defined in claim 4 wherein the feature space is the DCT domain and the images are compressed using at least one of JPEG, MPEG2, H.261, H.263, and MPEG4 compression standards.

10. A method as defined in claim 1 wherein the at least one energy difference is responsive to a multi-scale approach.

11. A method as defined in claim 3 wherein the images are received as non-compressed, further comprising performing a DCT transformation to the non-compressed image data for detection.

12. A method as defined in claim 1 wherein the at least one energy difference is responsive to a three-dimensional DCT space plus time approach.

13. A method as defined in claim 1 wherein the at least one energy difference is responsive to at least one of a gray level and color approach.

14. A system for illumination invariant change detection between first and second images comprising:
   a processor;
   an energy ranking unit in signal communication with the processor for extracting block coefficients for the first and second images and computing at least one energy difference responsive to the coefficients for at least one radial frequency energy between the first and second images, and scaling the radial frequency energies for one of the first or second images by a ratio of a first block coefficient of the other image to the first block coefficient of the one image; and
   a change detection unit in signal communication with the processor for analyzing the at least one energy difference and detecting a scene change if the energy difference is indicative of change.

15. A system as defined in claim 14, further comprising at least one of an imaging adapter and a communications adapter in signal communication with the processor for receiving image data.

16. A system as defined in claim 14 wherein the at least one energy difference is responsive to illumination change as a local contrast change.

17. A system as defined in claim 14 wherein the at least one energy difference is responsive to illumination change detection with a ranking approach.

18. A system as defined in claim 14 wherein the at least one energy difference is responsive to detection with ranking only extremes DCT coefficients.

19. A computer-readable medium tangibly embodying a computer program to perform program steps for illumination invariant change detection between first and second images, the program steps comprising:

extracting block coefficients corresponding to radial frequency energies for the first and second images;

scaling the radial frequency energies for one of the first or second images by a ratio of a first block coefficient of the other image to the first block coefficient of the one image;

computing at least one energy difference for at least one of the radial frequency energies between the first and second images;

analyzing the at least one energy difference; and detecting a scene change if the energy difference is indicative of change.

20. A device as defined in claim 19 wherein the first and second images are processed in the feature space.

* * * * *